March 30, 1943.     M. J. BALDWIN     2,315,386
PROTECTIVE POWER SYSTEM
Filed Oct. 21, 1942

Inventor:
Morris J. Baldwin,
by Harry E. Dunham
His Attorney.

Patented Mar. 30, 1943

2,315,386

UNITED STATES PATENT OFFICE 2,315,386

PROTECTIVE POWER SYSTEM

Morris J. Baldwin, Erie, Pa., assignor to General Electric Company, a corporation of New York Application October 21, 1942, Serial No. 462,822

17 Claims. (Cl. 172—179)

My invention relates to protective power systems and more particularly to such systems used for self-propelled vehicles, such as locomotives, provided with a plurality of driving motors to protect against wheel slippage.

An object of my invention is to provide an improved protective power system for minimizing wheel slippage.

Another object of my invention is to provide an improved power system for self-propelled vehicles wherein the power supplied to the driving motors is reduced if a driving wheel driven by a motor tends to slip.

A further object of my invention is to provide a power system for a vehicle in which an unbalance in motor torques of different driving motors results in a torque balance restoring action by minimizing the motor armature currents.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
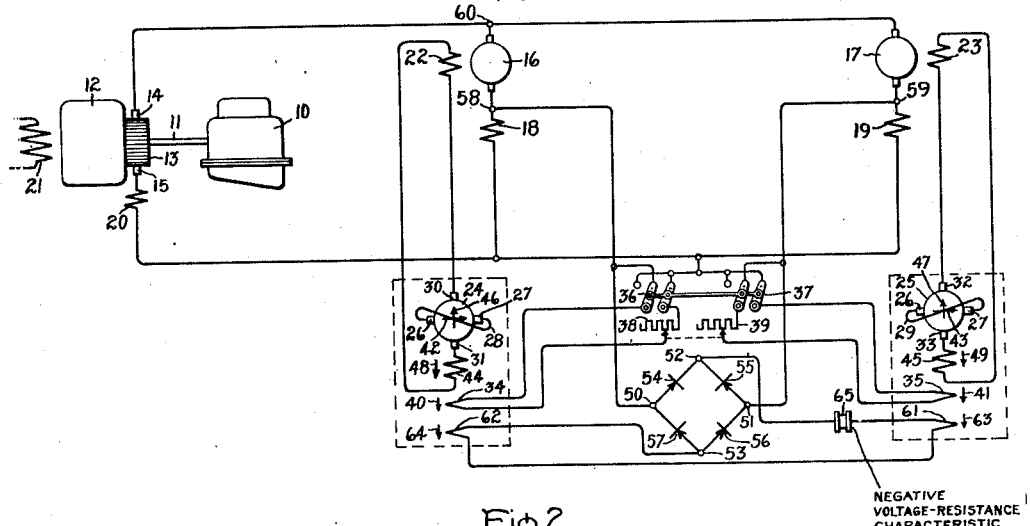
Figure 2:
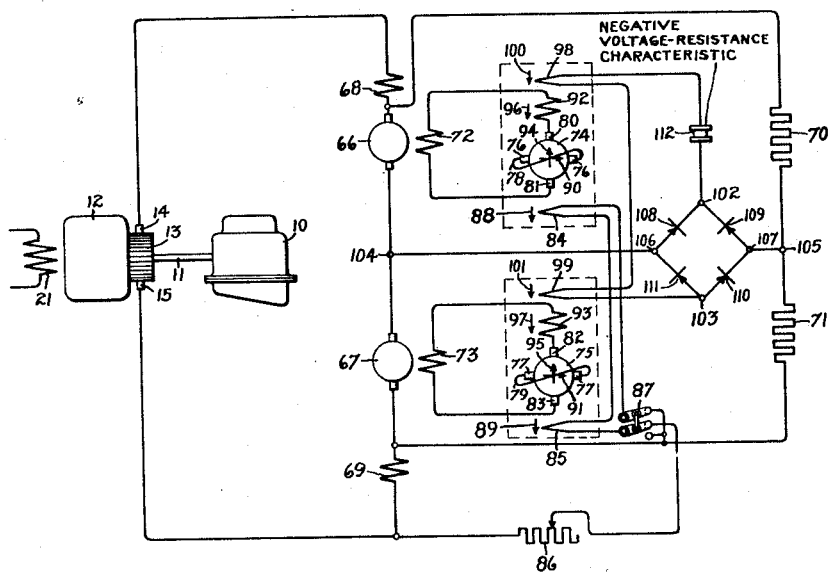

In the drawing, Fig. 1 schematically illustrates a power system embodying my invention wherein a plurality of motors is connected in parallel and adapted to be supplied with power from a main generator for driving a self-propelled vehicle, and these motors are arranged in a pair of normally balanced circuits adapted to control the excitation of an exciter connected to a field exciting winding of the motors to minimize wheel slippage; and Fig. 2 schematically illustrates modification of the arrangement shown in Fig. 1 wherein the motors are connected in series.

Referring to the drawing, I have shown a power system adapted to drive a self-propelled vehicle having a prime mover 10, such as a Diesel engine, provided with a shaft 11 arranged to drive the armature 12 of a main electric generator. The generator armature is provided with a winding connected to a commutator 13, and a set of brushes 14 and 15 provides an electrical contact with the commutator 13 and is connected to a plurality of vehicle driving motors 16 and 17. These driving motors are adapted to drive the wheels of the self-propelled vehicle and are connected in a pair of normally balanced electrical circuits by connecting the armatures of the motors 16 and 17 and the commutating fields 18 and 19 thereof respectively in parallel with each other. The two motors 16 and 17 and the respective commutating exciting windings of these motors form a pair of parallel circuits connected in series with a generator commutating field exciting winding 20 and across the brushes 14 and 15 of the main generator 12. The main field excitation of the generator 12 is provided by a separately excited field exciting winding 21 which is adapted to be energized by any suitable source of electrical power supply.

It is desirable that the driving motors 16 and 17 should have series motor characteristics and that wheel slippage of the driving wheels of the vehicle driven by these motors be prevented or minimized. In order to obtain these two results, I provide an arrangement for exciting the motors with a basic series field excitation combined with a component of excitation adapted to cause the counterelectromotive force of the motors to increase with wheel slippage, thereby causing an increase in the motor counterelectromotive forces and a decrease in the motor armature currents and consequently in the motor torques. The motors 16 and 17 are provided with field exciting windings 22 and 23 adapted to be energized by armature reaction excited dynamo-electric machines 24 and 25, respectively, adapted to be driven by any suitable sources of mechanical power. Each of the armature reaction excited dynamo-electric machines shown in this figure is an amplidyne exciter provided with an armature and sets of primary brushes 26 and 27 which are short-circuited by electrical conductors 28 and 29 to provide primary circuits through the armatures. Sets of secondary or load brushes 30 and 31 and 32 and 33 are arranged about the commutators of the amplidyne exciters and are displaced substantially 90 electrical degrees thereabout from the primary brushes 26 and 27 to provide secondary circuits through the armatures of the amplidyne exciters. The main control excitations of the amplidyne exciters are provided by field exciting windings 34 and 35 which are adapted to be energized in proportion to the armature currents of the respective motors 16 and 17 by connecting them across the motor commutating field exciting windings 18 and 19 through simultaneously operable reversing switches 36 and 37 and variable resistors 38 and 39, respectively. The reversing switches provide for reversal of the energization of the exciter field exciting windings 34 and 35 and consequently of the motor field exciting windings 22 and 23. This provides for reversal of the motors. The energization of the field exciting windings 34 and 35 is controlled by the variable resistors 38 and 39.

Energization of the field exciting windings 34 and 35 provides components of excitation to the amplidyne exciters as indicated by the arrows 40 and 41, and rotation of the exciter armatures generates voltages in the armatures which cause currents to flow through the primary circuits of the armatures. This flow of electric current through the primary armature circuits produces primary components of armature reaction as indicated by the arrows 42 and 43 which are cut by the conductors of the armature windings connected to the commutators between the secondary brushes. These secondary brushes are connected to the main motor field exciting windings 22 and 23 and in series with exciter compensating field exciting windings 44 and 45. This flow of secondary currents produces secondary components of armature reaction in the exciters as indicated by the arrows 46 and 47 opposed to the control components of excitation 40 and 41 provided by the exciter control field exciting windings 34 and 35. The exciter compensating field exciting windings 44 and 45 are constructed and arranged such that the flow of electric current therethrough provides components of excitation to the amplidyne exciters as indicated by the arrows 48 and 49 which are substantially equal and opposite to the secondary components of armature reaction 46 and 47, and thereby minimize any back coupling effects of secondary or load currents in the armatures with the main exciter control field exciting windings 34 and 35. The components of excitation provided by the exciter main control field exciting windings and the compensating field exciting windings are both arranged along the secondary brush commutating axis of the amplidyne exciters, and, therefore, act along the same axis as the secondary or load components of armature reaction.

In order to prevent wheel slippage of the driving wheels of the vehicle driven by the motors 16 and 17, I provide an electrical interconnection between the armatures and the commutating field exciting windings of the two motors and utilize the amplidyne exciters to control the torques developed by the motors by controlling the back-electromotive forces of the motors for restoring substantially balanced torque to all of the motors. This interconnection includes an electrical bridge circuit having two pairs of diametrical terminals 50 and 51, and 52 and 53. One-way rectifiers 54, 55, 56 and 57 are connected respectively between the sets of terminals 50 and 52, 52 and 51, 51 and 53, and 53 and 50 in the form of a full-wave rectifier capable of passing current from the terminal 53 to the terminals 50 and 51 and from these terminals to the terminal 52. With such an arrangement, current may pass into the bridge circuit at the terminal 53 and out of the bridge circuit at the terminal 52, irrespective of whether the terminal 50 or the terminal 51 is the terminal of higher potential. The connection points 58 and 59 between the commutating windings 18 and 19 and the motor armatures normally are equipotential points in the pair of normally balanced motor circuits. These normally balanced motor circuits are so arranged that when the driving wheels of the vehicle operate at substantially the same speed from standstill to any desired speed, the motors 16 and 17 operate at substantially the same speed and the points 58 and 59 remain at substantially the same potential. However, if one of the wheels tends to slip, the armature of the motor which is driving that wheel will operate at a higher speed than the armature of the motor which drives a wheel which is not slipping. This results in the generation of a higher back-electromotive force in the armature of the motor driving the wheel which slips and, therefore, unbalances the voltage between the common connection point 60 of the two motors to the generator brush 14 and the normally equipotential points 58 and 59, such that one of these latter points connected to the motor driving the slipping wheel is at a lower potential than the point which is connected to the other motor, and current will tend to flow from the point connected to the motor arranged to drive the non-slipping wheel toward the point connected to the motor driving the slipping wheel. In so doing, current will tend to flow through the full-wave rectifier out of the terminal 52. The diametric pair of terminals 52 and 53 is connected to field exciting windings 61 and 62 arranged to provide components of excitation as indicated by the arrows 63 and 64 along the secondary brush commutating axes of the amplidyne exciters cumulative to the excitation provided by the main control field exciting windings 35 and 34, respectively. The terminals 52 and 53 of the bridge circuit are connected in series with a negative voltage-resistance characteristic resistor element 65 and the field exciting windings 61 and 62. A suitable bias-voltage also might be used in place of the element 65 to control the minimum unbalance effective on the system. The arrangement of this negative voltage resistance characteristic resistor in series with the amplidyne exciter field exciting windings has the effect of substantially preventing the flow of current in this circuit below a predetermined difference in potential between the diametrical terminals 52 and 53 of the bridge circuit and, therefore, between the points 58 and 59 of the balanced motor circuits which might be due to slightly unbalanced conditions in the motor circuits. Furthermore, when the predetermined voltage difference occurs, the resistance of the resistor 65 decreases and a relatively large current flows through the field exciting windings 61 and 62, thereby providing large components of excitation and quick response of the amplidyne exciters 24 and 25 to the excitations of these field exciting windings. Thus, if a wheel driven by one of the motors 16 or 17 slips to such an extent that the difference in voltage between the normally equipotential points 46 and 47 and, therefore, across the pair of diametric bridge circuit terminals 40 and 41, causes an electric current to flow through the field exciting windings 61 and 62, cumulative components of excitation 63 and 64 to the components of excitation 41 and 40 are provided by the control field exciting windings 35 and 34, thereby increasing the excitation of the amplidyne exciters and increasing the energization of the main motor field exciting windings 23 and 22. This results in an increase in the counter-electromotive forces of the motors 17 and 16, such that the armature currents of the motors decrease and the motor driving the slipping wheel is not sufficiently energized to continue driving the wheel. When slippage of the wheel ceases, the two motors 16 and 17 again will provide a pair of normally balanced electrical circuits, and the amplidyne exciter field exciting windings 61 and 62 will become deenergized, such that the excitation provided to the motor by the field exciting windings 23 and 22 will be restored to normal, thereby again providing the desired voltage for normal operation of the driving motors 17 and 16. In this manner, protection against wheel slippage is provided with inherent restoration of the power supplied to the driving motors when the two normally balanced circuits of the motors are restored to balanced conditions.

In Fig. 2 I have shown a modification of the self-propelled vehicle driving power system having a different arrangement of the driving motors and the amplidyne exciter control. In this system, a prime mover 10, such as a Diesel engine, provided with a shaft 11 is arranged to drive the armature 12 of a main electric generator. This generator armature is provided with a winding connected to a commutator 13, and a set of brushes 14 and 15 is arranged in contact with the commutator 13 and connected to a plurality of vehicle wheel driving motors 66 and 67. As in Fig. 1, the generator is provided with excitation by a field exciting winding 21 which is energized by any suitable source of electrical power supply.

In this system the motors are connected in series with each other and are provided with commutating field exciting windings 68 and 69, respectively. The driving motors 66 and 67 are connected in a pair of normally balanced electrical circuits by connecting the armatures of these motors in parallel with resistors 70 and 71, respectively, through an electrical interconnection including a full-wave rectifier bridge circuit. As in the arrangement shown in Fig. 1, the driving motors 66 and 67 are provided with excitation systems adapted to provide them with basic series motor characteristics with components of excitation adapted to minimize wheel slippage. This excitation is provided by field exciting windings 72 and 73 adapted to be energized by exciters 74 and 75, respectively, of the armature reaction excited type, which are adapted to be driven by any suitable source of mechanical power. In this figure, the exciters are amplidyne type machines provided with armatures and sets of primary brushes 76 and 77 which are short-circuited by electrical conductors 78 and 79 to complete primary circuits through the exciter armatures. Sets of secondary or load brushes 80 and 81, and 82 and 83 are arranged about the commutators of the amplidyne exciters and displaced substantially 90 electrical degrees thereabout from the primary brushes to provide secondary circuits through the amplidyne exciter armatures.

The amplidyne exciters are controlled by main control field exciting windings 84 and 85 adapted to be energized in proportion to the armature currents of the series connected driving motors 66 and 67 by connecting them across the commutating field exciting winding 69 through a variable resistor 86 and a reversing switch 87. The variable resistor provides for the control of the energization of the field exciting windings 84 and 85 and the reversing switch 87 provides for the reversal of the motors by reversal of the excitation of the fields produced by the motor field exciting windings 72 and 73. Energization of the control field exciting windings 84 and 85 provides components of excitation to the amplidyne exciters along the secondary brush commutating axes thereof as indicated by the arrows 88 and 89, and rotation of the exciter armatures generates voltages in the armatures which cause currents to flow through the primary circuits of the armatures. The flow of electric currents through the exciter primary armature circuits produces primary components of armature reaction as indicated by the arrows 90 and 91 which are cut by the conductors of these armature windings connected to the commutator between the secondary brushes. Voltages are generated between these brushes and they are connected in series with the motor control field exciting windings 72 and 73 and in series with exciter compensating field exciting windings 92 and 93. This flow of secondary current produces secondary components of armature reaction 94 and 95 along the secondary brush commutating axes of the exciters in opposition to the excitations 88 and 89 provided by the exciter control field exciting windings 84 and 85. In order to minimize the current required for energizing the exciter control field exciting windings, the compensating field exciting windings 92 and 93 are constructed and arranged to provide components of excitation 96 and 97 along the secondary brush commutating axes of the exciters in opposition to the secondary armature reactions 94 and 95. These compensating components of excitation are substantially equal and opposite to the secondary components of armature reaction and thereby minimize back coupling effects of secondary or load currents in the armatures with the main exciter control field exciting windings.

In order to prevent wheel slippage of the driving wheels of the vehicle, auxiliary field exciting windings 98 and 99 are arranged to provide components of excitation along the secondary brush commutating axes of the amplidyne exciters as indicated by the arrows 100 and 101 cumulative to the main control components of excitation 88 and 89. The energization of these field exciting windings 98 and 99 is provided by connecting them in series and across diametrical terminals 102 and 103 of a bridge circuit which interconnects substantially equipotential mid-points 104 and 105 of the normally balanced electrical circuits including the driving motors 66 and 67 and the resistances 70 and 71. The bridge circuit which interconnects the subtsantially equipotential points 104 and 105 is provided with two pairs of diametrical terminals 106 and 107 and the terminals 102 and 103. As in the arrangement shown in Fig. 1, one-way rectifiers 108, 109, 110 and 111 are connected respectively between the sets of terminals 106 and 102, 102 and 107, 107 and 103, and 103 and 106 in the form of a full-wave rectifier capable of passing current from the terminal 103 to the terminals 106 and 107, and from these terminals to the terminal 102. With this arrangement, current may pass into the bridge circuit at the terminal 103 and out of the bridge circuit at the terminal 102, irrespective of whether the terminal 106 or the terminal 107 is the terminal of higher potential. The pair of normally balanced motor circuits will maintain the points 104 and 105 at substantially the same potential during normal operation of the motors 66 and 67, irrespective of the speed of the motors, as long as these motors operate at substantially the same speed. However, if one of the wheels driven by a motor tends to slip, the armature of the motor which is driving that wheel will operate at a higher speed than the armature of the motor which drives a wheel which does not slip. The result of this operation is that a higher back-electromotive force is generated in the armature of the motor driving the wheel which slips. This unbalances the voltages of the interconnected points 104 and 105 such that the voltage across the slipping motor becomes higher than the voltage across the non-slipping motor, and, therefore, the potential of the point 104 between the two motors may be higher or lower than the potential of the point 105 between the resistances 70 and 71 and current may flow from the diametrical terminal 106 or the diametrical terminal 107 to the diametrical terminal 102 through a negative voltage-resistance characteristic element 112 through the field exciting windings 98 and 99 to the diametrical terminal 103. As in the arrangement shown in Fig. 1, the element 112 has the effect of substantially preventing the flow of current through the field exciting windings 98 and 99 below a predetermined difference in potential across the terminals 102 and 103 and, therefore, below a predetermined difference in potential between the interconnected normally equipotential points 104 and 105. This resistance element can be replaced by a suitable bias voltage if desired. Thus, with this construction, current will flow in the same direction through the auxiliary control field exciting windings 98 and 99, irrespective of which driving motor 66 or 67 is connected to the slipping wheel, and the excitation provided by this field exciting winding, therefore, will be in the same direction, irrespective of which driving motor drives the slipping wheel. Therefore, if a wheel driven by one of the motors slips to such an extent that the energization of the field exciting windings 98 and 99 produces cumulative components of excitation 100 and 101 to the control field exciting winding components of excitation 88 and 89, the voltage of the amplidyne exciters and, therefore, the excitations of the motor field exciting windings 72 and 73 are increased, and the back-electromotive forces of the motors are increased, such that the motor armature currents are reduced and the motor which drives the slipping wheel is not sufficiently energized to continue driving the wheel. When slippage of the wheel ceases, the two motors 66 and 67 again will provide a pair of normally balanced electrical circuits and the potential of the interconnected points 104 and 105 will become substantially equal, such that the amplidyne exciter field exciting windings 98 and 99 will become de-energized. Under this condition, the energization of the motor field exciting windings 72 and 73 is restored to normal, thereby again providing the desired normal operation of the driving motors. In this manner, protection against wheel slippage is inherently provided with automatic restoration of power to the driving motors when the two normally balanced motor circuits are restored to normal conditions. Since the field exciting windings of both of the amplidyne exciters 74 and 75 are energized in the same manner, these two machines can be replaced by a single exciter of the required capacity if this is found to be more practical or desirable.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A power system for a self-propelled vehicle including a prime mover, an electric generator arranged to be driven by said prime mover, a plurality of driving motors, means for electrically connecting said motors to said generator, means including a field exciting winding on each of said motors for controlling the torque developed by said motors, dynamo-electric means for controlling the energization of each of said motor field exciting windings, control field exciting windings for said dynamo-electric means, means for connecting said motors in a pair of normally balanced electrical circuits, means responsive to unbalance in said motor normally balanced circuits for providing a cumulative component of excitation to the component of excitation provided by said dynamo-electric means control field exciting windings for restoring substantially balanced torques to all of said motors.

2. A power system for a vehicle including a plurality of driving motors, means for connecting said motors to a source of electrical power supply, dynamo-electric means for controlling the torque developed by said motors, a control field exciting winding for said dynamo-electric means, means for connecting said motors in a pair of normally balanced electrical circuits, a second field exciting winding arranged to provide a component of excitation to said dynamo-electric means along the same axis as said control field exciting winding, means for energizing said second field exciting winding responsive to unbalance in said motor normally balanced circuits for providing a cumulative component of excitation to the component of excitation provided by said dynamo-electric means control field exciting winding for restoring substantially balanced torques to all of said motors.

3. A power system for a self-propelled vehicle including a prime mover, an electric generator arranged to be driven by said prime mover, a plurality of driving motors, means for electrically connecting said motors to said generator, means including a field exciting winding on each of said motors for controlling the torque developed by said motors, dynamo-electric means for controlling the energization of each of said motor field exciting windings, means for connecting said motors in a pair of normally balanced electrical circuits, second field exciting windings arranged to provide a component of excitation to said dynamo-electric means along the same axis as said control field exciting windings, means for energizing said second field exciting windings responsive to unbalance in said motor normally balanced circuits for providing a component of excitation to said dynamo-electric means for restoring substantially balanced torque to all of said motors.

4. A power system for a vehicle including a plurality of driving motors, means for electrically connecting said motors to a source of electrical power supply, means including a field exciting winding on each of said motors for controlling the torque developed by said motors, means for connecting said motors in a pair of normally balanced electrical circuits, dynamo-electric means for controlling the energization of each of said motor field exciting windings, control field exciting windings for said dynamo-electric means, second field exciting windings arranged to provide a component of excitation to said dynamo-electric means along the same axis as said control field exciting windings, means for energizing said second field exciting windings responsive to unbalance in said motor normally balanced circuits for providing a cumulative component of excitation to the component of excitation provided by said dynamo-electric means control field exciting windings for restoring substantially balanced torques to all of said motors.

5. A power system for a vehicle including a plurality of driving motors, means for connecting said motors to a source of electrical power supply, means including a field exciting winding on each of said motors for controlling the torque of said motors, an exciter for each of said motors connected to each respective motor field exciting winding, a control field exciting winding for each of said exciters, means for connecting said motors in a pair of normally balanced electrical circuits, a second field exciting winding for each of said exciters arranged to provide a component of excitation along the same axis as said control field exciting windings, unidirectional current means for energizing said exciter second field exciting windings responsive to unbalance in said motor normally balanced circuits for providing a cumulative component of excitation to the component of excitation provided by said exciter control field exciting windings for increasing the energization of said motor field exciting windings.

6. A power system for a self-propelled vehicle including a source of electrical power supply, a plurality of driving motors, means for connecting said motors to said source of electrical power supply, means including a field exciting winding on each of said motors for controlling the torque developed by said motors, means for connecting said motors in a pair of normally balanced electrical circuits, dynamo-electric means for controlling the energization of each of said motor field exciting windings, control field exciting windings for said dynamo-electric means, second field exciting windings arranged to provide a component of excitation to said dynamo-electric means along the same axis as said control field exciting windings, means for energizing said second field exciting windings responsive to unbalance in said motor normally balanced circuits for providing a cumulative component of excitation to the component of excitation provided by said dynamo-electric means control field exciting windings for restoring substantially balanced torques to all of said motors.

7. A power system for a self-propelled vehicle including a prime mover, an electric generator arranged to be driven by said prime mover, a plurality of driving motors, means for electrically connecting said motors to said generator, means including a field exciting winding on each of said motors for controlling the torque developed by said motors, dynamo-electric means for controlling the energization of each of said motor field exciting windings, control field exciting windings for said dynamo-electric means, means for connecting said motors in a pair of normally balanced electrical circuits, second field exciting windings arranged to provide a component of excitation to said dynamo-electric means along the same axis as said control field exciting windings, means for energizing said second field exciting windings responsive to unbalance in said motor normally balanced circuits for providing a cumulative component of excitation to the component of excitation provided by said dynamo-electric means control field exciting windings for restoring substantially balanced torques to all of said motors.

8. A power system for a vehicle including a plurality of driving motors, means for electrically connecting said motors to a source of electrical power supply, means including a field exciting winding on each of said motors for controlling the torque developed by said motors, dynamo-electric means including an exciter for each of said motors connected to each respective motor field exciting winding for controlling the energization of each of said motor field exciting windings, a control field exciting winding for each of said exciters, means for connecting said motors in a pair of normally balanced electrical circuits, a second field exciting winding arranged to provide a component of excitation to each of said exciters along the same axis as said control field exciting windings, means for energizing said second field exciting windings responsive to unbalance in said motor normally balanced circuits for providing a cumulative component of excitation to the component of excitation provided by said exciter control field exciting windings for restoring substantially balanced torques to all of said motors.

9. A power system for a vehicle including a plurality of driving motors, means for electrically connecting said motors to a source of electrical power supply, means including a field exciting winding on each of said motors for controlling the torque developed by said motors, means for connecting said motors in a pair of normally balanced electrical circuits, dynamo-electric means including an exciter for said motors connected to said motor field exciting windings for controlling the energization thereof, a control field exciting winding for said exciter, an electrical bridge circuit having two pairs of diametrical terminals, means for connecting a pair of said diametrical terminals each to a normally equipotential point of different circuits of said pair of normally balanced motor circuits, and means including a second field exciting winding for said exciter connected to the other pair of said diametrical terminals of said bridge circuits for energizing said exciter second field exciting winding responsive to unbalanced currents flowing in said bridge due to unbalance in said motor normally balanced circuits for providing a cumulative component of excitation to the component of excitation provided by said exciter control field exciting winding for increasing the energization of said motor field exciting winding.

10. A power system for a vehicle including a plurality of driving motors, means for electrically connecting said motors to a source of electrical power supply, means including a field exciting winding on each of said motors for controlling the torque developed by said motors, means for connecting said motors in a pair of normally balanced electrical circuits, dynamo-electric means including an exciter for said motors connected to said motor field exciting windings for controlling the energization thereof, a control field exciting winding for said exciter, an electrical bridge circuit having two pairs of diametrical terminals, means for connecting a pair of said diametrical terminals each to normally equipotential points of different circuits of said pair of normally balanced motor circuits, means including a second field exciting winding for said exciter connected to the other pair of said diametrical terminals of said bridge circuit for energizing said exciter second field exciting winding responsive to unbalanced currents flowing in said bridge due to unbalance in said motor normally balanced circuits for providing a cumulative component of excitation to the component of excitation provided by said exciter control field exciting winding, and means connected to said exciter second field exciting winding for substantially preventing energization of said exciter second field exciting winding below a predetermined unbalance in said motor normally balanced circuits.

11. A power system for a vehicle including a plurality of driving motors, means for electrically connecting said motors to a source of electrical power supply, means including a field exciting winding on each of said motors for controlling the torque developed by said motors, means for connecting said motors in a pair of normally balanced electrical circuits, dynamo-electric means including an exciter for each of said motors connected to each respective motor field exciting winding for controlling the energization of each of said motor field exciting windings, a control field exciting winding for each of said exciters, an electrical bridge circuit having two pairs of diametrical terminals, means for connecting a pair of said diametrical terminals each to different normally equipotential points of said pair of balanced motor circuits, and means including a second field exciting winding for each of said exciters connected to the other pair of said diametrical terminals of said bridge circuit for energizing said exciter second field exciting windings responsive to unbalanced currents flowing in said bridge due to unbalance in said motor normally balanced circuits for providing cumulative components of excitation to the components of excitation provided by said exciter control field exciting windings for increasing the energization of said motor field exciting windings.

12. A power system for a vehicle including a plurality of driving motors, means for electrically connecting said motors to a source of electrical power supply, means including a field exciting winding on each of said motors for controlling the torque developed by said motors, means for connecting said motors in a pair of normally balanced electrical circuits, dynamo-electric means including an exciter for each of said motors connected to each respective motor field exciting winding for controlling the energization of each of said motor field exciting windings, a control field exciting winding for each of said exciters, an electrical bridge circuit having two pairs of diametrical terminals, means for connecting a pair of said diametrical terminals each to different normally equipotential points of said pair of normally balanced motor circuits, means including a second field exciting winding for each of said exciters connected to the other pair of said diametrical terminals of said bridge circuit for energizing said exciter second field exciting windings responsive to unbalanced currents flowing in said bridge due to unbalance in said motor normally balanced circuits for providing cumulative components of excitation to the components of excitation provided by said exciter control field exciting windings for increasing the energization of said motor field exciting windings, and means connected to said exciter second field exciting windings for substantially preventing energization thereof below a predetermined unbalance in said motor normally balanced circuits.

13. A power system for a vehicle including a plurality of driving motors, means for electrically connecting said motors to a source of electrical power supply, means including a field exciting winding on each of said motors for controlling the torque developed by said motors, means for connecting said motors in a pair of normally balanced electrical circuits, dynamo-electric means including an exciter for each of said motors connected to each respective motor field exciting winding for controlling the energization of each of said motor field exciting windings, a control field exciting winding for each of said exciters, a second field exciting winding for each of said exciters, an electrical bridge circuit having four unidirectional current branches connected in a loop providing a full wave rectifier with a pair of diametrical terminals each connected to a pair of connected bridge branches having opposite unidirectional current characteristics and connected to different normally equipotential points of said pair of balanced motor circuits, a second pair of diametrical terminals each connected to a pair of connected bridge branches having the same directional unidirectional current characteristics, and means connecting said exciter second field exciting windings to the latter pair of said diametrical terminals for energizing said exciter second field exciting windings responsive to unbalanced currents flowing in said bridge due to unbalance in said motor normally balanced circuits for providing cumulative components of excitation to the components of excitation provided by said exciter control field exciting windings.

14. A power system for a vehicle including a plurality of driving motors, means for electrically connecting said motors to a source of electrical power supply, means including a field exciting winding on each of said motors for controlling the torque of said motors, means for connecting said motors in a pair of normally balanced electrical circuits, an armature reaction excited exciter, means including a set of primary brushes and a set of secondary brushes for providing a primary and a secondary circuit respectively through said exciter, means for connecting said motor field exciting windings to said exciter secondary brushes, means including a control field exciting winding for providing a component of excitation along the exciter secondary brush commutating axis, a second field exciting winding arranged to provide a component of excitation along the exciter secondary brush commutating axis, an electrical bridge circuit having two pairs of diametrical terminals, means for connecting a pair of said diametrical terminals each to normally equipotential points of different circuits of said pair of normally balanced motor circuits, and means connecting said exciter second field exciting winding to the other pair of said diametrical terminals of said bridge circuit for energizing said exciter second field exciting winding responsive to unbalanced currents flowing in said bridge due to unbalance in said motor normally balanced circuits for providing a cumulative component of excitation to the component of excitation provided by said exciter control field exciting winding for increasing the energization of said motor field exciting windings.

15. A power system for a vehicle including a plurality of driving motors, means for electrically connecting said motors to a source of electrical power supply, means including a field exciting winding on each of said motors for controlling the torque of said motors, means for connecting said motors in a pair of normally balanced electrical circuits, an armature reaction exciter for each of said motors having a set of primary brushes and a set of secondary brushes for providing a primary and a secondary circuit through each of said exciters, means for connecting each of said motor field exciting windings to secondary brushes of a different one of said exciters, means including control field exciting windings for providing components of excitation along the exciter secondary brush commutating axes, second field exciting windings arranged to provide components of excitation along the exciter secondary brush commutating axes, an electrical bridge circuit having two pairs of diametrical terminals, means for connecting a pair of said diametrical terminals each to normally equipotential points of different circuits of said pair of normally balanced motor circuits, and means connecting said exciter second field exciting windings to the other pair of said diametrical terminals of said bridge circuit for energizing said exciter second field exciting windings responsive to unbalanced currents flowing in said bridge due to unbalance in said motor normally balanced circuits for providing components of excitation along said exciter secondary brush commutating axes cumulative to the components of excitation provided by said exciter control field exciting windings for increasing the energization of said motor field exciting windings.

16. A power system for a vehicle including a plurality of driving motors, means for electrically connecting said motors to a source of electrical power supply, means including a field exciting winding on each of said motors for controlling the torque of said motors, means for connecting said motors in a pair of normally balanced electrical circuits, an armature reaction exciter for each of said motors having a set of primary brushes and a set of secondary brushes for providing a primary and a secondary circuit through each of said exciters, means for connecting each of said motor field exciting windings to secondary brushes of a different one of said exciters, means including control field exciting windings for providing components of excitation along the exciter secondary brush commutating axes, second field exciting windings arranged to provide components of excitation along the exciter secondary brush commutating axes, an electrical bridge circuit having two pairs of diametrical terminals, means for connecting a pair of said diametrical terminals each to normally equipotential points of different circuits of said pair of normally balanced motor circuits, means connecting said exciter second field exciting windings to the other pair of said diametrical terminals of said bridge circuit for energizing said exciter second field exciting windings responsive to unbalanced currents flowing in said bridge due to unbalance in said motor normally balanced circuits for providing components of excitation along said exciter secondary brush commutating axes cumulative to the components of excitation provided by said exciter control field exciting windings for increasing the energization of said motor field exciting windings, and means connected to said exciter second field exciting windings for substantially preventing energization thereof below a predetermined unbalance in said motor normally balanced circuits.

17. A power system for a vehicle including a plurality of driving motors, means for electrically connecting said motors to a source of electrical power supply, means including a field exciting winding on each of said motor for controlling the torque of said motors, means for connecting said motors in a pair of normally balanced electrical circuits, an armature reaction excited exciter having a set of primary brushes and a set of secondary brushes for providing a primary and a secondary circuit through said exciter, means for connecting said motor field exciting windings to said exciter secondary brushes, means including a control field exciting winding for providing a component of excitation along the exciter secondary brush commutating axis, means including a compensating field exciting winding for providing a component of excitation along the exciter secondary brush commutating axis substantially equal and opposite to the armature reaction of electric current through said exciter secondary brushes, a third field exciting winding arranged to provide a component of excitation along the exciter secondary brush commutating axis, an electrical bridge circuit having four unidirectional current branches connected in a loop providing a full wave rectifier with a pair of diametrical terminals each connected to a pair of connected bridge branches having opposite unidirectional current characteristics and connected to normally equipotential points of different circuits of said pair of normally balanced motor circuits, a second pair of diametrical terminals each connected to a pair of connected bridge branches having the same direction unidirectional current characteristics, and means connecting said exciter third field exciting winding to the latter pair of said diametrical terminals for energizing said exciter third field exciting winding responsive to unbalanced currents flowing in said bridge due to unbalance in said motor normally balanced circuits for providing a component of excitation along said exciter secondary brush commutating axis cumulative to the component of excitation provided by said exciter control field exciting winding.

MORRIS J. BALDWIN.